US005657259A

United States Patent [19]
Davis et al.

[11] Patent Number: 5,657,259
[45] Date of Patent: Aug. 12, 1997

[54] NUMBER FORMATTING FRAMEWORK

[75] Inventors: Mark E. Davis, Cupertino; John H. Jenkins, San Jose; Sanjay J. Poonen, Sunnyvale, all of Calif.

[73] Assignee: Object Technology Licensing Corp., Cupertino, Calif.

[21] Appl. No.: 184,127

[22] Filed: Jan. 21, 1994

[51] Int. Cl.$^6$ .............................. G06F 7/00; G06F 15/00; G06F 17/30
[52] U.S. Cl. ..................... 364/715.03; 341/62; 341/90; 395/614
[58] Field of Search ................ 364/715.03, 748; 341/62, 66, 75, 76, 84, 85, 90, 104–106; 395/144–151, 614

[56] References Cited

U.S. PATENT DOCUMENTS

| | | | |
|---|---|---|---|
| 3,860,908 | 1/1975 | Stratton, III | 341/90 |
| 4,415,766 | 11/1983 | Hyder | 341/90 |
| 5,050,121 | 9/1991 | Vaughan | 395/150 |
| 5,055,998 | 10/1991 | Wright et al. | 395/800 |
| 5,225,833 | 7/1993 | Fisher et al. | 341/90 |
| 5,257,369 | 10/1993 | Skeen et al. | 395/680 |
| 5,299,304 | 3/1994 | Williams et al. | 395/148 |
| 5,337,233 | 8/1994 | Hofert et al. | 395/803 |

FOREIGN PATENT DOCUMENTS

A9321591  10/1993  WIPO.

OTHER PUBLICATIONS

DEC Professional, V.6(9), Sep. 1987, US, pp. 108–110, D. Bynon "Vax Away".

IEEE Transactions on Software Engineering, V.SE–8(6), Nov. 1982, New York, US, pp. 605–611, N.G. Gehani, "Databases and Units of Measure".

IBM Technical Disclosure Bulletin, V.35(5), Oct. 1992, Armonk, US, pp. 217–218, XP000312939, "Data Conversion Method Between IBM Application and Lotus 1–2–3".

Business Software, V.5(1), Jan. 1987, US, pp. 54–59, Berry, T. "Has it Become Practical to Transfer Spreadsheets Between Programs?".

Primary Examiner—Reba I. Elmore
Assistant Examiner—Emmanuel L. Moise
Attorney, Agent, or Firm—Paul E. Kudirka

[57] ABSTRACT

A method and system for formatting numerical information. An object-based operating system provides various number formatting services. Some objects scan text and convert the text to numerical information, and convert non-text numerical information to text, and convert between different numerical formats and languages. The system provides a common ground from which application programs can speak a seemingly common numerical language without specifying the details of converting numerical information between systems of representation. The present system relieves application developers of the burden of handling details of numerical information, and provides ease of information transfer between monetary systems and cultures having differing languages. The system also provides for conversion between number formats to allow for easier processing and/or comprehension of the numerical information, and normalization and alignment of any textual representation of numeric information.

33 Claims, 8 Drawing Sheets

NUMBER FORMATTING FRAMEWORK

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems, and more particularly to a system and method for formatting numerical data.

BACKGROUND OF THE INVENTION

Computer systems today provide a wide range of efficiencies previously unavailable. The use of word processors, spreadsheets, database managers, finance managers, and other applications is enjoying unprecedented growth. This growth is global in nature. Presently, applications are typically designed as stand alone units which handle most, if not all, the processing related to the particular application. Occasionally the application may call on a disk operating system to perform basic I/O, but the bulk of processing is performed by the application program.

One of the most common types of data in computing is numerical data. Virtually every application program requires processing and manipulation of data. Because each application program handles numerical data internally, there is a wide variation in how numerical data is handled. This often creates incompatibilities between application programs. Another problem is a result of the shrinking global culture. There are a wide variety of monetary systems in the world, which create a correspondingly wide variety of notations and grammars which are used to convey monetary information. This variety results in complications in transferring information between parts of the world because the numerical monetary information must be appropriately reworked to be understood by the recipient of the information.

Other problems arise from the basic form in which numerical information is maintained. It is often the case that numbers begin as text, a form which can not be easily dealt with from a mathematical perspective. The numerical information has to be converted to a format which is easily handled, a form other than text. There are a wide variety of other numerical data inconsistencies beyond those considered above. But there is clearly a recognition that numbers appearing in one setting are not easily used in another setting. Whether it be between application programs, between geographical areas, between one storage format and another, between monetary systems, or between number system formats, any time there are inconsistencies, inefficiencies are created.

Therefore, there is a need to eliminate, or assist in eliminating, the inconsistencies of numerical information, or at least try to provide efficient systems and methods for converting numerical information from one system to another.

SUMMARY OF THE INVENTION

Accordingly, it is a primary object of the present invention to provide a system and method for providing improved number formatting.

It is another object of the present invention to provide tools for converting numerical information from one system to another.

It is yet another object of the present invention to provide tools for converting numerical information and associated information from one system to another.

It is still another object of the present invention to provide conversion of numerical information in one language to numerical information in another language.

The preferred embodiment is a system of objects which provide various number formatting services. Some objects scan text and convert the text to numerical information. Other objects convert non-text numerical information to text. Conversion between numerical formats and languages is also supported. The system provides a common ground from which application programs can speak a seemingly common numerical language without concern about the details of converting numerical information between systems of representation. The present system relieves application developers of the burden of handling details of numerical information. The system also provide ease of information transfer between monetary systems and cultures having differing languages. The system also provides for conversion between number formats to allow for easier processing and/or comprehension of the numerical information. These and other objects and advantages will become apparent from the discussion below.

DETAILED DESCRIPTION OF THE INVENTION

The detailed embodiments of the present invention are disclosed herein. It should be understood that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention. The history of object-oriented programming and the developments of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object oriented systems, the reader is referred to "Object Oriented Design With Applications," by Grady Booch.

While many object oriented systems are designed to operate on top of a basic operating system performing rudimentary input and output, the present system is used to provide system level support for particular features. It should be kept in mind, however, that innovative objects disclosed herein may also appear in layers above the system level in order to provide object support at different levels of the processing hierarchy. As used in the specification, claims and drawings, "numerical information" may include any information related to numbers. This includes text representing numbers, symbols representing numbers, various number systems, text associated with numbers, and symbols associated with numbers. Numerical information could be any information which conveys meaning relative to numbers. In general, it is conversion among this universe of information, as discussed explicitly herein, and known as conveying information regarding numbers, that the present invention is directed toward.

Figure 1:
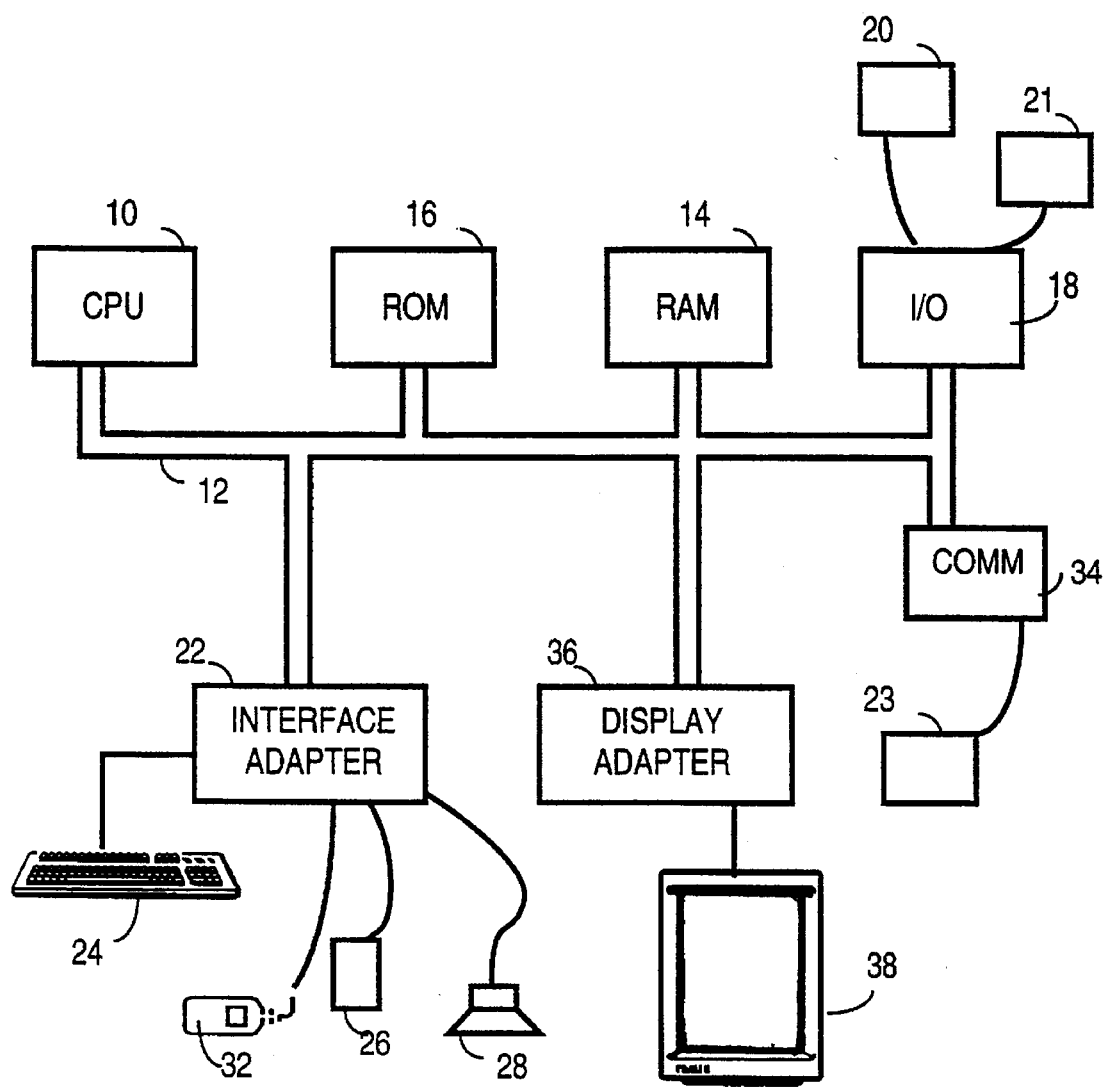
FIG. 1 illustrates a typical hardware configuration of a computer in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, and a number of other units interconnected via a system bus 12. The computer shown in FIG. 1 includes a Read Only Memory (ROM) 16, a Random Access Memory (RAM) 14, an I/O adapter 18 for connecting peripheral devices such as disk units 20 and other I/O peripherals represented by 21 to the system bus 12, a user interface adapter 22 for connecting a keyboard 24, a mouse 32, a speaker 28, a microphone 26, and/or other user interface devices such as a touch screen device (not shown) to the bus 12, a communication adapter 34 for connecting the workstation to a data processing network represented by 23. A display adapter 36 for connecting the bus to a display device 38. The workstation has resident thereon an operating system such as the Apple System/7® operating system.

Figure 2:
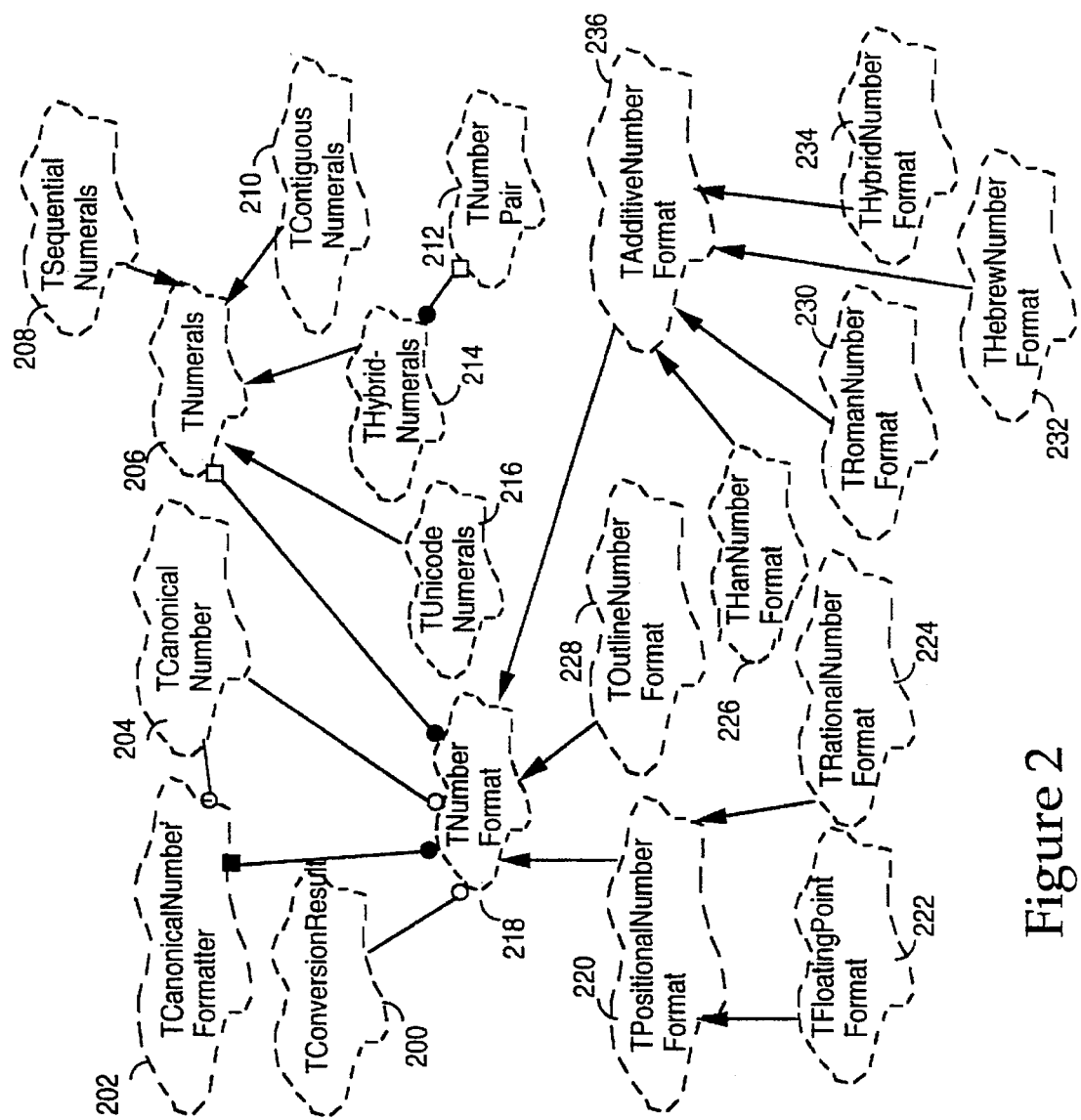
FIG. 2 is a Booch diagram illustrating the relationship between various classes used in number formatting in accordance with a preferred embodiment.

The present invention describes a set of classes that provide conversion services for numbers. Both text scanning to extract a number, and number formatting to convert a number to text, are handled by the same class. Number formats are provided for most numerical formats, and for different languages. It is also possible to use number formatting classes to format such numbers as $2.99792458 \times 10^8$ and (1,234.56) correctly, where parenthesis are used to indicate negative numbers. FIG. 2 provides an overview of the class relationships in the number formatting system. The number formatting classes use the TCanonicalNumberFormatter 202 and TCanonicalNumber 204 classes internally. The number formatting classes convert text to a TCanonicalNumber 204 and then, using a TCanonicalNumberFormatter 202, perform the further conversion to the binary level. Only people who create new number formatting classes will need to access the TCanonicalNumberFormatter 202, TCanonicalNumber 204, and their methods. Certain of the number formats are intended for specialized use, such as using Roman numerals in outlines or for numbering pages in prefaces. The base number format class is TNumberFormat 218, which is an abstract base class. The following are the most important methods defining the protocol in this base class:

void TextToNumber (const TText& theText, TConversionResult& theAccuracy, long double& theNumber, TRange& theTextRangeToUse).

Figure 3:
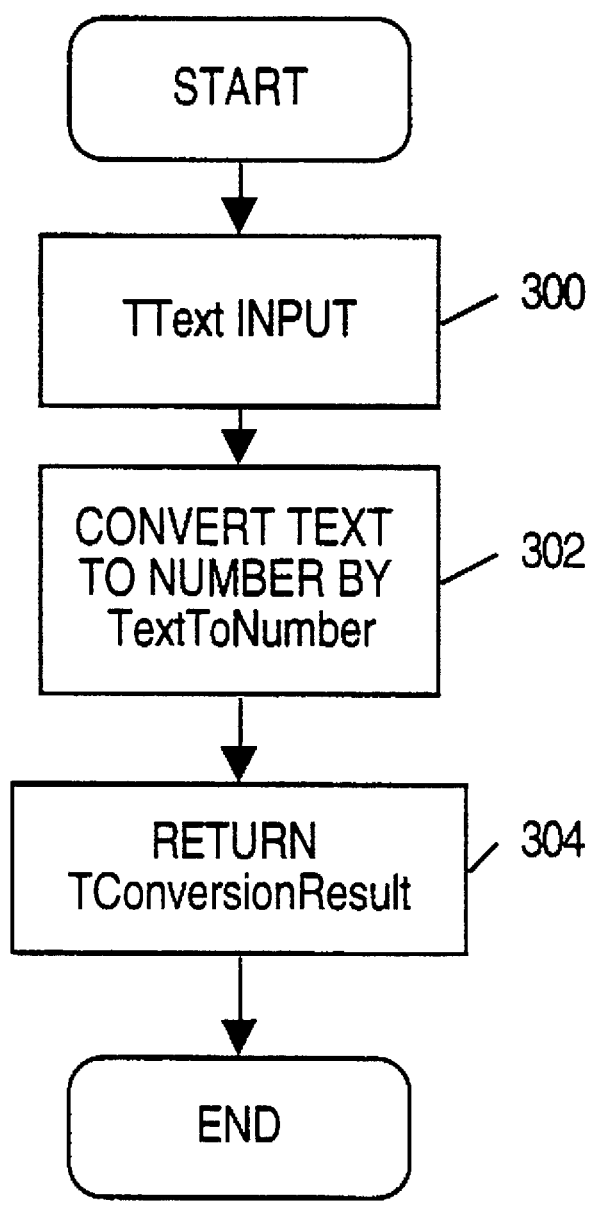
FIG. 3 shows the overall text to number conversion process in accordance with a preferred embodiment.

FIG. 3 shows the overall text to number conversion process. This is the most common scanning method for converting a TText object into a number. It takes a TText as its input at 300, converts the text at 302, and returns the scanned number. Information on how well the text was parsed is returned in the TConversionResult 200, at step 304. The TRange object is used to determine which portion of the text to convert; it defaults to the entire text. There is also a family of methods such as:

long double TextToLongDouble (const TText& theText, TConversionResult& theAccuracy, TRange& theTextRangeToUse);

double TextToDouble (const TText& theText, TConversionResult& theAccuracy, TRange& theTextRangeToUse); and These methods provide a convenient means for using converted numbers in function calls and similar situations where the exact type of number is known.

void NumberToText (const long double, TText&, TConversionResult&).

Figure 4:
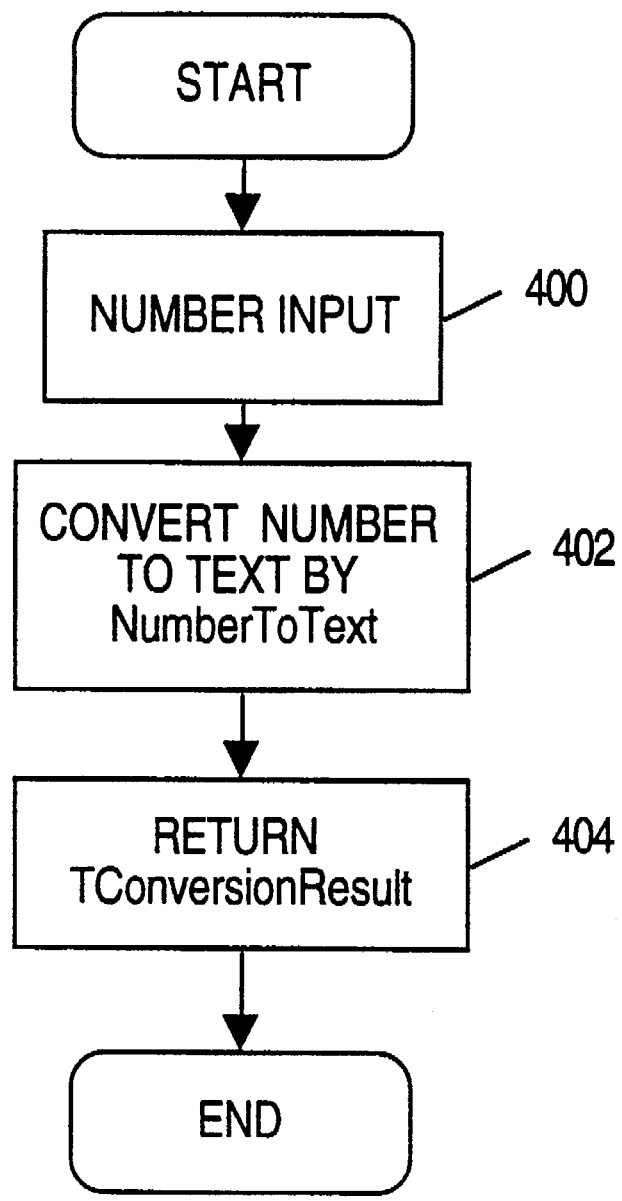
FIG. 4 shows the conversion of a number to text in accordance with a preferred embodiment.

FIG. 4 shows the conversion of a number to text. This method handles the conversion from an input number at 400, and converts the number to its textual representation at 402. A TConversionResult 200 is returned at 404 to indicate the success of the conversion; problems might arise, for example, from trying to write a number such as 1.618 in Roman numerals. (There are two reasons why an exception is not thrown by NumberToText() to indicate an incomplete conversion. One is that some number formats simply do not support all kinds of numbers. Since it is possible to do at least part of the conversion—in this case, turning 1.618 into "I"—this is not an error and an exception is not thrown.) Again, overloaded forms exist for different number types.

virtual GCoordinate MaxWidth (long double minNum, long double maxNum, const TStyleSet& styleSet)=0;

The method set forth directly above, takes as input a range of numbers, and returns the maximum width a number in the range can take up when displayed using the styleSet. This is a pure virtual method that must be overridden in any derived classes.

virtual long MaxCharCount (long double minNum, long double maxNum)=0;

This method, given a range of numbers, returns the maximum number of UniChar characters a number in the range can take up when converted to a TText. This is a pure virtual method that must be overridden in any derived classes.

PLUS AND MINUS SIGNS

Distinct formatting for positive and negative numerals is provided by appending text at the beginning or end of a formatted numeral. Certain methods are used to specify the text used on either side of a positive or negative numeral and related properties. The default behavior that these methods assume is that some text is appended before and after every numeral to indicate its sign. This text may or may not be empty. Negative numerals always have the specified text appended; positive numerals may or may not—this is controlled by the SetShowPlusSign(). Thus, the familiar behavior would be to append a minus sign at the beginning of negative numerals and nothing at the end. Positive numerals can be set apart by inserting a "+" at the beginning.

Not all number formatting classes need use this default behavior. Some, such as the TRomanFormat 230, ignore it by specifying empty strings for the prefix and suffix text. Others can override the methods in TNumberFormat 218 that set up the default behavior, as set forth below.

```
Boolean UsesStandardNegation()
    // defaults to always return TRUE
NormalizeSign(TStandardText& text, TConversionResult& result,
    Boolean& isNegative)
    // appends the negative prefix and suffix text to
    // text, updating result, if isNegative is TRUE
    // appends the positive prefix and suffix text to
    // text, updating result, if isNegative is FALSE
    // and ::GetShowPlusSign() is TRUE
ConfirmSignPrefix (const TStandardText& text, TRange& range,
    TConversionResult& result, Boolean& negFlag)
ConfirmSignSuffix (const TStandardText& text, TRange& range,
    TConversionResult& result, Boolean& negFlag)
```

The default affixes for positive numbers are empty strings, as is the default suffix for negative numbers. The default prefix for negative numbers, however, is "-", which, despite appearances is not the minus sign/hyphen we all know and love from ASCII, but the visually identical version of the minus sign.

OUT OF BOUNDS

Every number format has a numerical range associated with it over which it can produce valid results. For example, Roman numerals are generally not used to represent numbers below 1 and are only rarely used to represent numbers above 5000. There are five methods used in connection with the range for a number formatter: methods:

```
virtual Boolean    IsValidNumber   (long double) const;
    //  is the number between the minimum and maximum?
virtual long double    GetMinNumber    () const;
virtual long double    GetMaxNumber    () const;
virtual void           SetMinNumber    (long double);
virtual void           SetMaxNumber    (long double);
```

Figure 5:
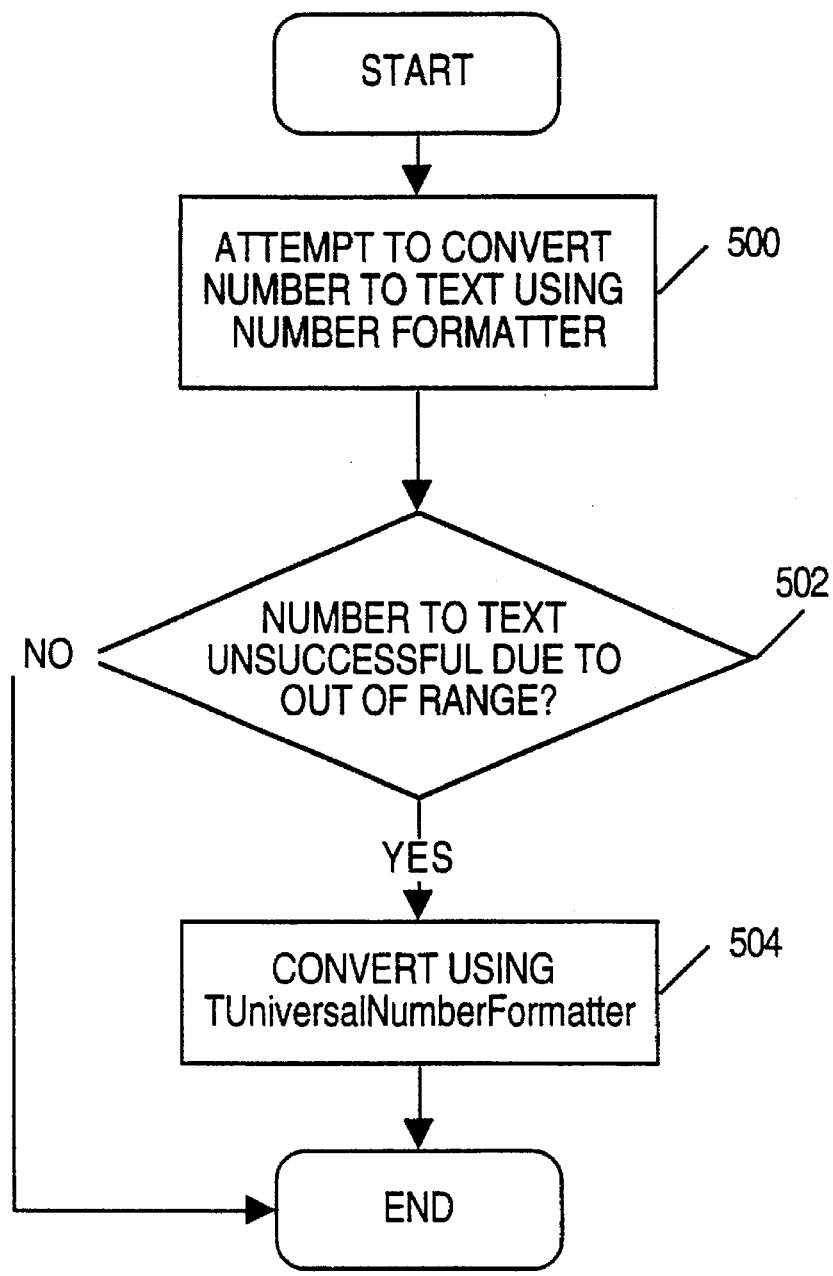
FIG. 5 shows conversion using two number formatters in accordance with a preferred embodiment.

FIG. 5 shows the number to text process using the number formatter. At step 500, if an unsuccessful attempt to turn an out of range number into text is detected at 502, then an universal number formatter is used at 504. Each number formatter contains another number formatter to use in just such a situation. By default, this out of bounds number formatter is a TUniversalNumberFormatter, which is guaranteed to be able to handle any number.

Figure 6:
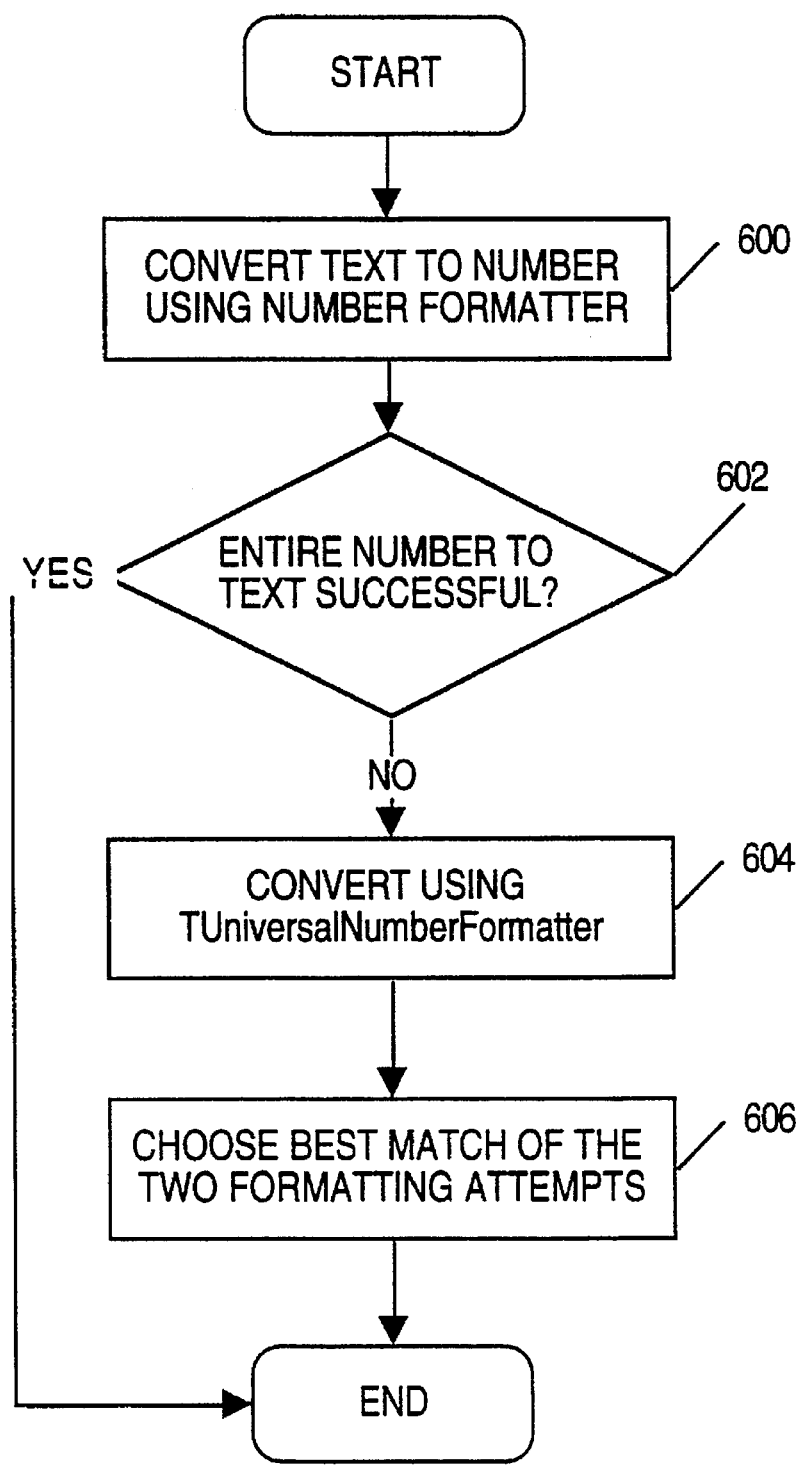
FIG. 6 illustrates two formatters using a best match algorithm in accordance with a preferred embodiment.

A similar situation exists for turning text into numbers, illustrated at FIG. 6. Each number formatter attempts to turn text to a number by itself, at 600. If it was unable to turn the entire text into a number, it will see what the out of bounds number format can do, at 602, 604, and returns the better match of the two (i.e., the one that used more of the original text), at 606. The process is reversed if converting in the other direction.

You can set the out of bounds number format used by a number formatter with the method:

void    AdoptOutOfBoundsNumberFormat (TNumberFormat *);

Note that we're using adopt semantics here; the number format will assume responsibility for the storage of the adopted out of bounds format. It would be pretty meaningless to have an out of bounds number format with a smaller range than the number format initially employed, so AdoptOutOfBoundsNumberFormat() determines that the out of bounds number format has the larger range before adopting it.

TConversionResult 200, TNumeral 206, and
TCanonicalNumber 204 TCanonicalNumber 204

Figure 7:
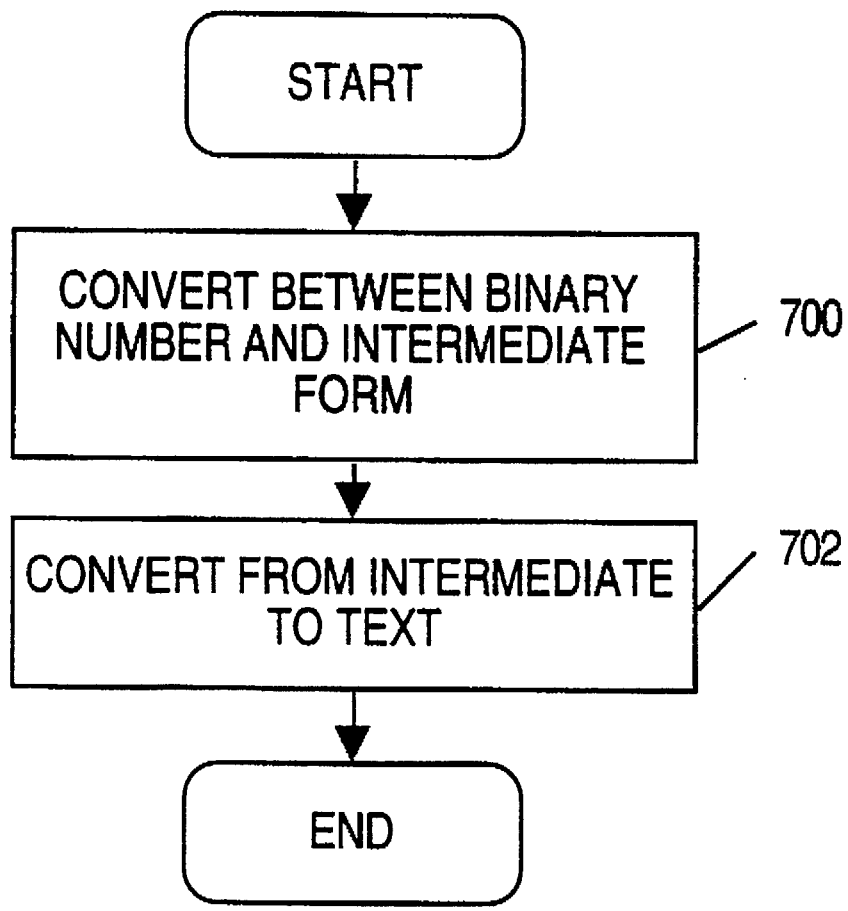
FIG. 7 shows the two step conversion process between binary and text in accordance with a preferred embodiment.

The process of conversion between text and binary numerals falls algorithmically into two distinct parts: one part is primarily concerned with numerical formatting such as rounding, while the other handles the mechanics of writing systems. The TNumberFormatter class 218 formats numbers, as shown in FIG. 7, by dividing the process into two steps: conversion between a binary number and a standard intermediate form (a TCanonicalNumber 204) at 700; and conversion between the standard intermediate form and text at 702.

TConversionResult 200

TConversionResult could be implemented by two classes, TScanResult and TFormattingResult to provide more directed classes of conversion results.

The number formatting classes do not make heavy use of exceptions. There are two reasons for this. One reason is that mistakes are not really exceptional. A user sometimes types an ill-formed numeral and expects it to be converted to a binary number. It will also be common for a user to expect a binary number to be converted to text using an inappropriate format (e.g., writing π using Roman numerals).

The other reason exceptions are not heavily relied upon is that even if a full conversion is impossible, a partial conversion may be possible, which is better than nothing. It may not be possible to write π in Roman numerals, but a close approximation can be achieved by writing "III" Depending on the rounding options, thus notation may correspond with the desired result.

Figure 8:
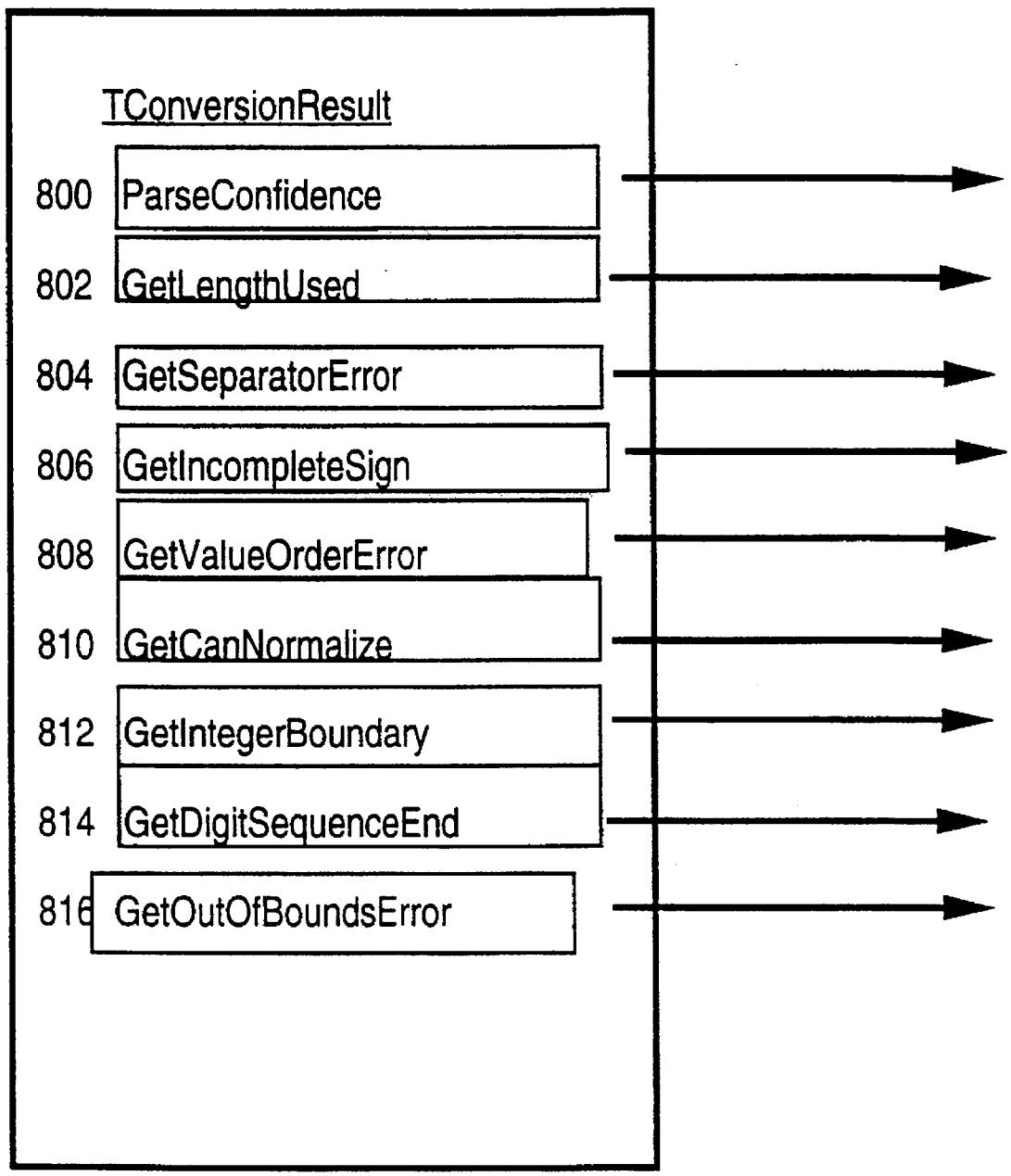
FIG. 8 shows the ConversionResult object and the data which the object maintains in accordance with a preferred embodiment.

The TConversionResult 200 class, as shown in FIG. 8, exists to provide extensive information to a programmer regarding how successful a conversion was. It also conveys other information about a conversion which a programmer may find helpful.

The information which can be obtained from a TConversionResult 200 is presented below.

virtual ParseConfidence GetConfidence() const;

A ParseConfidence 800 is a floating-point number between 0.0 and 1.0 that indicates an overall rating of the conversion. It could typically be used to indicate which number format might be a better one for a particular conversion:

```
//    Given long double aNum, and number formats format1, format2
TConversionResult result1, result2;
TText text1, text2, theText;
format1.NumberToText(aNum, text1, result1);
format2.NumberToText(aNum, text2, result2);
//    use the result of whichever conversion did the better job
if (result1.GetConfidence() > result2.GetConfidence())
    theText = text1;
else theText = text2;
virtual unsigned long GetLengthUsed() const;
```

GetLengthUsed 802 indicates how many characters in a given text string were used in a conversion from text to a number. It can be used by text parsers to indicate where the next stage of the parsing should take place.

virtual Boolean GetSeparatorError() const;

GetSeparatorError 804 is used to indicate an error involving a digit separator in a conversion from text to a binary number. For example, the numeral "1,23.45" is clearly intended to mean "123.45". In this instance, the conversion will take place, and GetSeparatorError() will return TRUE.

virtual Boolean GetIncompleteSign() const;

GetIncompleteSign 806 is used to indicate an error involving a plus or minus sign in a conversion from text to a binary number. For example, if we have set negative numerals to be bracketed with parentheses, then "(123.45" would seem to be a mistake for (123.45)". In this instance, the conversion will take place, and GetIncompleteSign() will return TRUE.

virtual Boolean GetValueOrderError() const;

GetValueOrderError 808 is used to indicate an error involving the order of digits in number formats which are sensitive to digit order—specifically, Roman numerals. The string "IILCMM" would appear to be an attempt at writing a Roman numeral, but the order of the digits is incorrect. A Roman number formatter would do its best to turn this string into a binary number and GetValueOrderError() would return TRUE.

virtual Boolean GetCanNormalize() const;

GetCanNormalize 810 returns TRUE if a text string can be turned into a binary number and back into a text string in such a fashion that:

(a) no rounding would take place; and (b) appending a character at the end of the normalized string would leave us with a valid number.

For example, suppose a standard, American number formatter is employed which uses commas for digit separators and periods for decimal separators, with parentheses for the minus sign and at most four decimal places specified.

"123.45" could be normalized—it would become "123.45".

"1,23.45" could be normalized—it would become "123.45".

"12345.67" could be normalized—it would become "12,345.67".

"123.456789" could not be normalized—it would become "123.4567" and the "89" would be lost.

"(123.45" could not be normalized—it would become "(123.45)"; appending a "6" would turn this into the invalid string "(123.45)6".

A proper, rational number formatter, would present the following results.

"3" could be normalized—it would become "3".

"3 1" could not be normalized—the rational number formatter would assume the denominator meant was "1" and turn the whole thing into "4". This counts as rounding.

"3½" could be normalized—the rational number formatter would normalize it to "3½".

virtual unsigned long GetIntegerBoundary() const;

Many number formatters are used to format non-integral values. Decimal tabbing requires information on where the separation between integer and fractional portions of a numeral takes place. GetIntegerBoundary() 712 returns an index into the text string generated by a number to text conversion giving precisely this information.

virtual unsigned long GetDigitSequenceEnd() const;

Many number formats involve a numeral and some surrounding text. For example, it is not uncommon to see negative numbers indicated by using parenthesis, as in "($1,000)." It is therefore important to know where the numerical portion of a formatted numeral ends (particularly if it has been normalized), so that editing of the text can take place starting at the proper point. This information is returned by GetDigitSequenceRange(TTextRange&) 714.

virtual Boolean GetOutOfBoundsError() const;

Every number formatter has a range of values it can represent associated with it. It also has an associated number formatter to use in case a number given it to convert is out of bounds. If a number formatter has to use its out-of-bounds formatter to convert a number to text, then GetOutOfBoundsError() 716 returns TRUE. In the following code fragment, for example, a different color is used to indicate an out-of-bounds number conversion.

```
TRGBColor theInBoundsColor(0.2,0,0);
TRGBColor theOutOfBoundsColor (0.25, 0.25, 0.25);
TConversionResult           theResult;
theFormat->NumberToText ( aNum, numText, theResult);
if (theResult.GetOutOfBoundsError())
    DrawNumber (numText, theOutOfBoundsColor);
else DrawNumber (numText, theInBoundsColor);
```

TNumerals 206

TNumerals 206 is a class that is used by the number format for the individual numeral char-value mapping, i.e. that the value of kDigitSeven is 7 in a U.S. decimal format and that kRomanNumeralTen has the value 10 using Roman numerals.

The main methods within TNumerals 206 for use in number formatting are:

virtual Boolean NumeralToValue (UniChar ch, long& value)=0;

virtual Boolean ValueToNumeral (long value, UniChar& ch)=0;

The TNumerals 206 object used by a particular TNumberFormat 218 defines what the numerals are for that instance of the object only. It would be perfectly possible to have an instance of a TNumberFormat 218 object that uses the letter "q" for 1 and "z" for 7. Developers writing their own number format objects should use the information derived from the object's TNumerals 206. An exceptional case would be a number formatter such as the TUniversalNumberFormat class, which is specifically designed to handle any valid numerical digit.

There are currently four TNumerals 206 subclasses—TUnicodeNumerals 216 which uses the default numerical characteristics defined by Unicode; TSequentialNumerals 208 for a numeral set where the values are sequential; TContiguousNumerals 210 where, in addition to the values being sequential, the characters representing them are also contiguous; and THybridNumerals 214 for arbitrary sets of numeral-value pairs. A numeral-value pair is an association of a UniChar and its numerical value (e.g., "L"=50 in Roman numerals, "β"=2 in Greek) and is represented by a TNumeralPair object.

TUnicodeNumerals 216

The TUnicodeNumerals 216 class will accept any of the digit values defined for text-to-binary conversions. Thus, the Latin-Arabic digit one, the Arabic-Indic digit 1, the Devanagari digit 1, and so on, will all have the value 1.

To handle binary-to-text conversions, the TUnicodeNumerals 216 object needs to know which set of digits to use. This is done with the methods void SetScript (TUnicode::ScriptName);

TUnicode::ScriptName GetScript (void);

The script can also be specified when a TUnicodeNumerals 216 object is constructed. (The default is TUnicode::kRoman.) When providing the UniChar that a certain value maps to, the TUnicodeNumerals 216 class uses the script information to determine which possible UniChar would be appropriate. Thus, with the script equal to TUnicode::kRoman, TUnicode::kGreek, or TUnicode::kCyrillic, it would return TUnicode::kDigitOne for 1. If the script were TUnicode::kArabic, it would return TUnicode::kArabic_indicDigitOne, and so on.

THybridNumerals 214

A THybridNumerals 214 object contains two sets of numeral pairs. One set of pairs is used for converting text to numbers only; this is the set of scanning pairs. Two different UniChar's can be associated with the same numerical value in this list (e.g., for Roman numbers, either "i" or "I" would be converted to 1). Number pairs are added to the set of scanning pairs using the method AddScanningPair(). There is also a set of formatting pairs in which each numerical value can be associated with at most one UniChar. Everything in the collection of formatting pairs is considered automatically to be in the set of scanning pairs. A number pair is added to the set of formatting pairs by using the method AddFormattingPair().

Thus Roman numerals can be defined to use either "i" or "I" as being equal to 1 in turning text to numbers but insist on using only "I" in turning numbers to text.

TNumberFormat 218 subclasses

TPositionalNumberFormat 220

A TPositionalNumberFormat 220 is used for integers written with a value-based system where the value of a digit depends partly on the digit itself and on where it is found in the numeral. The TPositionalNumber format defines a number of additional setter and getter methods to determine, for example, the rounding method to use (the rounding methods available are defined in CanonicalNumber.h), the number of digits to display, and so on. The most important of these include:

```
// The digit group separator is the text to use between
// groups of digits in a numeral
// Americans usually use "," as a digit group separator,
// Europeans usually use "." A space is also popular.
virtual void GetDigitGroupSeparator (TText&) const;
virtual void SetDigitGroupSeparator (const TText&);
// how many digits are in a group: in the West, 3 is
// common (1,000,000), whereas in the Orient, 4 is often
// used (1,0000,0000)
virtual int GetSeparatorSpacing () const;
virtual void SetSeparatorSpacing (int);
// should we show integer separation?
// 1000000 (false) vs. 1,000,000 (true)
virtual Boolean GetIntegerSeparatorOn () const;
virtual void SetIntegerSeparatorOn (Boolean);
// precision specifies how the formatted number (NumberToText)
// should be rounded.
// multiple is the increment value and rounding specifies
// how to round in conversions.
virtual void GetPrecision (long double& multiple,
    ERoundRule& rounding) const;
virtual void SetPrecision (long double multiple,
    ERoundRule rounding);
// minInt is the minimum number of digits to display
// when formatting a number as text. Also known as
// zero-padding.
virtual int GetMinIntegerDigits () const;
virtual void SetMinIntegerDigits (int);
```

TFloatingPointFormat 222

TFloatingPointFormats 222 are used for position-based numeral systems which extend the algorithm to include non-integers. A TFloatingPointFormat could represent π, for example, as 3.14159265358979323846264338327950. The TFloatingPointFormat 222 includes special methods to specify such parameters as the number of decimal points to display; these include:

```
// The decimal character is the character to put between
// the "left" and "right" hand sides of the decimal
// representation--Americans use "." and Europeans ","
virtual void GetDecimalSeparator (TText&) const;
virtual void SetDecimalSeparator (const TText&);
// Do we display a decimal point even for integers?
virtual Boolean GetDecimalWithInteger () const;
virtual void SetDecimalWithInteger (Boolean);
// Use the separator character in the fractional part?
virtual Boolean GetUseSeparatorForFraction () const;
virtual void SetUseSeparatorForFraction (Boolean);
// Use the separator character in the exponent?
virtual Boolean GetUseSeparatorForExponent () const;
virtual void SetUseSeparatorForExponent (Boolean);
virtual int GetMinFractionDigits () const;
virtual void SetMinFractionDigits (int);
virtual int GetMaxFractionDigits () const;
virtual void SetMaxFractionDigits (int);
```

TUniversalNumberFormat

This is a special subclass of TFloatingPointFormat 222, which has a universal range (and the class used as the default out-of-bounds number format for all other number formats). TUniversalNumberFormat can handle infinity, NaN's of various types (such as the results of division by zero). Its main purpose is to provide a default out-of-bounds format and guarantee that any format will return something when asked to turn any binary number into a numeral.

TRationalNumberFormat

This is derived from TPositionalNumberFormat 220 and adds the capability of writing non-integral values as the ratio between two integers. There are two special enum's within this class, one to specify a fraction's "propriety" and one to determine if a fraction is written numerator first (as is usually done in the West) or denominator first (as is traditionally done in China).

enum EFractionPropriety {kProperFraction, kImproperFraction};

enum EFractionDirection {kNumeratorFirst, kDenominatorFirst};

Proper fractions are those whose numerator is less than their denominator $$\left(\text{e.g., } ``3\frac{1}{7}"\right)$$

and improper or vulgar fractions are those whose numerator may or may not be less than their denominator $$\left(\text{e.g., } \frac{22}{7}\right).$$

A character is also specified (usually TUnicode::kSpace) to use between the integral and fractional portion of a rational number, and whether or not to make the numeral a superscript and the denominator a subscript. This character facilitates switching between "355/113" and "355/113", for example.

Each rational number format requires information associated with formatting integers, however. This is specified by using the methods

```
virtual TNumberFormat*    GetIntegerFormat() const;
virtual void              AdoptIntegerFormat (TNumberFormat *);
```

The integer format defaults to a standard TPositionalNumberFormat 220, but can be overridden. This allows full control over the representation of the numerator and denominator of a rational number and makes "III I/VII" as easy to write as "2²/₇".

For the sake of compatibility with older character set standards, a set of fractional numeral characters such as "½" and "⅓" are also defined. There are also different characters that can be used to separate the numerator and denominator of a fraction, such as kSlash (i.e., "/") and kFractionSlash ("/").

The TRationalNumberFormat 224 object supports the use of these characters only in conversion from text to numbers. Because few fonts contain glyphs for the fraction characters, conversion from numbers to text will use the standard Arabic numeral characters and styled text to represent fractions.

```
// construct TRationalNumberFormat
TRationalNumberFormat* rationalFormat;
// default base 10, kDigitZero..kDigitNine, so don't pass in numerals
object
// conversion example
TConversionResult parseResult;
TText testText("42²/₁₆");
long double num = rationalFormat->TextToLongDouble(testText,
parseResult);
     // num is now 42.125
rationalFormat->NumberToText(num, testText, parseResult);
// testText is now "42⅛"
```

TOutlineNumberFormat

This method is derived from TNumberFormat 218 and implements an outline-style numbering scheme of the sequence a, b, c, . . . , z, aa, bb, cc, . . . , zz, aaa, . . .

```
// construct TOutlineNumberFormat
TContiguousNumerals outlineNumerals(TUnicode::kLatinSmallLetterA,
1,26);
// numerals are 'a'. .'2' withe values starting at 1
TOutlineNumberFormat* outlineFormat;
outlineFormat = new TOutlineNumberFormat(outlineNumerals, 26); //
numerals, base
// convert using TOutlineNumberFormat
TConversionResult parseResult;
TText testText("cc");
long num = outlineFormat->TextToLong(testText, parseResult);
// num is now 29
outlineFormat->NumberToText(num, testText, parseResult); //back
again
Note: TOutlineNumberFormat is shown as element 228 in FIG. 2.
```

TAdditiveNumberFormat

We are most familiar with a number system which is positional in number, where the value of each symbol depends on its position. Other common number systems are additive in nature, where each symbol has an inherent value and the total value of a number is obtained by adding the value of each symbol, usually without regard for the order in which the symbols occur. The most common instance used in America are the Roman numerals.

TAddiditiveNumberFormat 236 is derived from TNumberFormat 218 and handles simple additive numerical representations, where the values of different numerals are just added together to form the number; i.e. the number 47 is represented as "μζ" in classical Greek, where "μ" is used to represent 40 and "ζ" represents 7. This class by itself is not very intelligent; it would accept "ιιιζ," "ικζ," or "κζκ" as 47 as readily as the correct "μζ." It is not much more sophisticated in turning numbers to text. Number systems with more sophisticated conversion algorithms or more sophisticated error checking would need to be represented by subclasses, as is done with Roman and Hebrew numerals.

TRomanNumberFormat 230

This method is derived from TAddiditiveNumberFormat 236 and handles Roman numerals. The support for Roman numerals is largely intended for limited situations such as page numbers or numbers in an outline. The control of the case of Roman numerals is facilitated by using the following:

```
enum ERomanNumeralCase { kUpperCase, kLowerCase };
ERomanNumberalCase   GetRomanNumeralCase( )    const;
void                 SetRomanNumeralCase (const ERomanNumeralCase);
```

Note that any Roman number format will freely accept either upper or lower case in scanning: "MCMXCII", "mcmxcii" and "mCmXcIi" will all become 1992. You do, however, explicitly control whether upper or lower case letters are used when turning binary numbers into numerals. There are a number of different systems for Roman numerals that differ among themselves in their use of the "subtractive principle," whereby 4 is represented as "IV" (5−1) rather than "IIII" (1+1+1+1).

TRomanFormat 230 has a special enum defined to control this behavior:

```
enum ERomanNumeralType {  kShort,
                          kNormalLong4Long8,
                          kNormalLong4Short8,
                          kNormalShort4Long8,
                          kNormalShort4Short8,
                          kLong };
```

The short system uses the subtractive principle as much as possible to make the Roman numeral as short as can be. The long system never uses the subtractive principle at all (and was the original system, favored by purists). The others vary in whether they use subtraction to represent 4's and 8's.

| Number | 4 | 6 | 8 | 9 | 1999 |
|---|---|---|---|---|---|
| kShort | IV | VI | IIX | IX | IM |
| kNormalLong4Long8 | IIII | VI | VIII | IX | MCMXCIX |
| kNormalLong4Short8 | IIII | VI | IIX | IX | MCMXCIX |
| kNormalShort4Long8 | IV | VI | VIII | IX | MCMXCIX |
| kNormalShort4Short8 | IV | VI | IIX | IX | MCMXCIX |
| kLong | IIII | VI | VIII | VIIII | MDCCCCLXXXX VIIII |

There are also variations in the treatment of numbers greater than 5,000. There is little consistency among ancient writers (because they had trouble counting so high) and little need today (because better number systems exist). For the sake of compatibility with older character set standards, an embodiment defines a set of Roman numeral characters in addition to their Latin letter counterparts. There is a Roman numeral "I" distinct from the letter "I", a Roman numeral "ii," and so forth in both upper- and lower-case forms.

The TRomanFormat 230 object supports the use of these characters only in conversion from text to numbers. Because few fonts will have glyphs for the Roman numeral characters, conversion from numbers to text will not use the Roman numeral characters in Unicode, including the rare Roman numerals such as 5,000 (Ð) and 10,000 (⊕), and the alternate form of 1,000 (ⓒ) which have no analogs in the alphabet. These characters can, however, be used in text-to-number conversions.

There is one final variation to consider: in some contexts, it is usual to use the letter "J" instead of the letter "I" as the last letter in a Roman numeral, thus writing 6 as "VJ" or "vj" rather than "VI" or "vi." This behavior can also be controlled (the default is not to terminate with "J").

Boolean GetTerminatesWithJ() const;

void SetTerminatesWithJ(const Boolean);

The use of an arbitrary THybridNumerals 214 object is not supported with TRomanFormat 230. There is no need to specify a THybridNumerals 214 object or base in the constructor for TRomanFormat 230. This behavior is overridden by subclassing TRomanFormat 230.

```
// construct TRomanNumberFormat
TRomanNumberFormat* romanFormat = new TRomanNumberFormat
(TRomanNumberFormat::kUpperCase);
// conversion example
TConversionResult parseResult;
long num = 1992;
TText testText;
romanFormat->NumberToText(num, testText, parseResult);
    // testText is now "MCMXCII"
romanFormat-
>SetRomanNumeralCase(TRomanNumberFormat::kLowerCase);
romanFormat->NumberToText(num, testText, parseResult);
    // testText is now "mcmxcii"
num = romanFormat->TextToLong(testText, parseResult);    // num is
now 1992
```

THebrewNumberFormat 232

Hebrew numerals are written using the Hebrew alphabet in a fashion similar to the ancient Greek numerals, where the first nine letters are assigned the values 1 through 9, the next nine 10 through 90, and so on. The value of a numeral is the total value of the letters making it up. This would ordinarily be represented by using a TAdditiveNumberFormat 236; but to avoid using portions of the ineffable Name of God as numerals, 14 must be written as 9+5 (יה) not 10+4 (יד) and 15 as 9+6 (יו). This necessitates using a special object for Hebrew numerals. Hebrew does not distinguish between upper- and lower cases, and there are no alternate characters that might be used in turning numbers to Hebrew numerals, so there are no complications beyond this one in the THebrewNumberFormat 232. There is no need to specify a THybridNumerals 214 object or base in the constructor for THebrewNumberFormat 232.

There is a variation of the Hebrew numeral system used in Jewish, medieval, mystical documents—the Cabala. THebrewNumberFormat 232 provides an interface for distinguishing cabalistic from standard Hebrew numerals.

THybridNumberFormat 234

This is derived from TAddiditiveNumberFormat 236 and adds the capability of having a threshold where numerals are used in a multiplicative instead of additive way; i.e. in the following example using Chinese numerals, the number 1729 would be represented as [1][1000][7][100][2][10][9] (一千七百二十九) to signify 1·1000+7·100+2·10+9.

```
// construct THybridNumberFormat
THybridNumerals chineseNumerals;
chineseNumerals.AddFormattingPair(TUnicode::kHanNumeralOne, 1);
    // parameters are UniChar, long
    // repeat for each numeral to add
chineseNumerals.AddFormattingPair(TUnicode::kHanNumeralOne,
1000);
THybridNumberFormat* chineseFormat;
chineseFormat= new THybridNumberFormat(chineseNumerals, 10, 10);
    // parameters are numerals,
    // base, threshold
```

THanNumberFormat 226

The ancient civilizations of East Asia—such as Japan, Korea, Vietnam, and particularly China—had a highly developed hybrid number system still in common use. These are supported by the THanNumberFormat 226 class, where "Han" is a comon name used in East Asia to refer to their civilizations.

As is the case with Roman numerals, there are a number of varying systems used to write Han numerals. However, because the ancient Chinese were, unlike the Romans, skilled mathematicians, and because their empire was larger, more populous, more stable, and considerably longer lasting, the variations in Han numerals have very large numbers, on the order of ten million or higher. There are also variations of Han numerals which are based on Western numerals and are fully positional, and where special shortened forms of numbers 21 through 39 are used (calendar numerals). These are supported by an enum within the THanNumberFormat 226 class:

```
enum EHanNumberType    {    kHanCalendar,
                            kHanStandard,
                            kHanXiaDeng,
                            kHanZhongDeng,
                            kHanShangDeng,
                            kHanWestern };
```

The standard system is the one in most frequent use and provides the uniform approach for writing numerals up to 99,999. There are three standard systems for writing larger numbers, the xiadeng (low-level), zhongdeng (mid-level), and shangdeng (upper level) systems. All three systems use ten additional characters for representing numerals:

| TUnicode:: | | Xiadeng value | Zhongdeng value | Shangdeng value |
|---|---|---|---|---|
| 億 | kHanNumeralYi | $10^5$ | $10^8$ | $10^8$ |
| 兆 | kHanNumeralZhao | $10^6$ | $10^{12}$ | $10^{16}$ |
| 京 | kHanNumeralJing | $10^7$ | $10^{16}$ | $10^{32}$ |
| 垓 | kHanNumeralGai | $10^8$ | $10^{20}$ | $10^{64}*$ |
| 補 | kHanNumeralBu | $10^9$ | $10^{24}$ | $10^{128}*$ |
| 秭 | kHanNumeralZi | $10^9$ | $10^{24}$ | $10^{128}*$ |
| 穰 | kHanNumeralRang | $10^{10}$ | $10^{28}$ | $10^{256}*$ |
| 溝 | kHanNumeralGou | $10^{11}$ | $10^{32}$ | $10^{512}*$ |
| 澗 | kHanNumeralJian | $10^{12}$ | $10^{36}$ | $10^{1024}*$ |
| 正 | kHanNumeralZheng | $10^{13}$ | $10^{40}$ | $10^{2048}*$ |
| 載 | kHanNumeralZai | $10^{14}$ | $10^{44}$ | $10^{4096}*$ |

Most people familiar with the Han enumeration system should be able to work through the differences between the three systems. For details on how these systems work, please see *From one to zero* by Georges Ifrah (New York: Viking Penguin, Inc., ©1985), pp. 365 et seq.

The final wrinkle in the use of Han numerals is the promulgation of simplified characters in the People's Republic of China. While these have largely replaced the traditional forms within mainland China itself, the traditional forms continue to be more common in Japan, Korea, Hong Kong, and Taiwan and are the default forms used by the THanNumberFormat 226 class. As usual, however, either form will be read correctly by the formatter, and an interface is provided for specifying which to use in formatting numbers as text:

```
enum EHanSimplification { kHanSimplified, kHanTraditional };
EHanSimplification      GetHanSimplification() const;
void SetHanSimplification (const EHanSimplification);
```

WRITING A NEW TNUMBER FORMAT 218

Developers who write their own TNumberFormat 218 objects will need to write the methods that convert text to and from the TCanonicalNumberFormatter 202 format. These conversions are done through two pure virtual methods listed below.

```
virtual void TextToCanonicalNumber (const TText&, const
    TRange&, TCanonicalNumber&, TConversionResult&)=0;

virtual void CanonicalNumberToText (const TCanonicalNumber&,
    TText&, TConversionResult&)=0;
```

Developers who write their own TNumberFormat 218 objects should not find it necessary to override the NumberToText and TextToNumber methods, as these methods merely call CanonicalNumberToText and TextToCanonicalNumber to create the canonical number format and use the appropriate TCanonicalNumberFormatter 202 and TCanonicalNumber 204 methods for the most efficient binary-canonical number format conversion.

Note that the TCanonicalNumberFormatter 202 used by a TNumberFormat 218 is persistent. The number formatting classes defined by the present invention provide default values for the fields within TCanonicalNumberFormatter 202 and include setters and getters for these fields where appropriate. This means that developers writing their own TNumberFormat 218 objects do not need to worry about many of the details of setting up a TCanonicalNumberFormatter 202 and TCanonicalNumber 204 but can concentrate on those details relevant to their needs. In particular, it will not be necessary to override the methods that set and return the values for TCanonicalNumberFormatter 202 fields such as precision and rounding. These are handled by the setters and getters in the TPositionalNumberFormat 220, TFloatingPointFormat 222, and TRationalNumberFormat 224 objects.

USING A NUMBER FORMAT

The above interface is what one uses to convert between numbers and text, in the examples below using a TNumberFormat 218* format.

```
TText testText;
long double num = 42;
TConversionResult parseResult;   // object for returning parse info
format->NumberToText(num, testText, parseResult);
// testText now has the textual representation of the number, defined by
format
// now convert from text back to number
num = format->TextToLongDouble(testText, parseResult);    // num is
now 42
// query TConversionResult object how exact the conversion was
ParseConfidence confidence = parseResult.GetConfidence();
// confidence is a floating-point number where 1.0 is a perfect score
unsigned long lengthUsed = parseResult.GetLengthUsed();
// lengthUsed returns how many Unichars were used from the input text
// now convert just a part (the first UniChar) of a TText object
num = format->TextToLongDouble(testText, parseResult, TRange(0,1));
// num is now most probably different, depending on what the textual
representation of
// the number 42 is in the number format 'format'.
```

MANIPULATING A NUMBER FORMAT

The following example uses a TFloatingPointNumberFormat object to show some unique parameters that can be changed for that class of number format.

```
// first the default behavior
long double num = 42125.67;
TText testText;
TConversionResult parseResult;
floatFormat->NumberToText(num, testText, parseResult);
    // testText is now "42,125.67"
// change format to include at most one decimal
floatFormat->SetMaxFractionDigits(1);
floatFormat->NumberToText(num, testText, parseResult);
    // testText is now "42,125.6"
// change format to always include at least three decimals, even with
trailing zeros
floatFormat->SetMinFractionDigits(3);
floatFormat->SetMaxFractionDigits(6);
floatFormat->NumberToText(num, testText, parseResult);
    // testText is now "42,125.670"
// change to not use the thousands separator
floatFormat->SetIntegerSeparatorOn(FALSE);
// inherited from TPositionalNumberFormat
floatFormat->NumberToText(num, testText, parseResult);
    // testText is now "42125.670"
```

CONSTRUCTING NUMBER FORMATS

Once there is a user preference mechanism in place, one will be able to get the user's preferred formats and simply use the interface for TNumberFormat 218 polymorphically for number conversion. There will also be predefined number formats for different language regions so you will rarely have to construct a number format yourself. The following are the concrete number formatting classes that are currently provided, with code samples of how to create them. Note that some TNumberFormat 218 objects require a TNumerals 206 and base in their constructor while others do not. See the section on auxiliary objects, above.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for use in a computer system having a processor and a storage, the apparatus converting numerical information between a first format and a binary number and comprising:
   (a) a canonical number formatter object in the storage which translates numerical information between a standard intermediate form and a binary number;
   (b) a number formatter framework residing in the storage having a plurality of number formatting classes arranged in a class hierarchy, each of the plurality of number formatting classes having methods for converting numerical information between one of a plurality of first formats and the standard intermediate form; and
   (c) means responsive to numerical information in the first format for polymorphically instantiating a number formatting object from one of the plurality of number formatting classes.

2. The apparatus of claim 1, wherein each of the number formatting classes includes at least one text-to-number conversion method for converting text to at least one number.

3. The apparatus of claim 2, wherein the text-to-number conversion method includes:
   at least one method for converting text to the standard intermediate form; and wherein the canonical number formatter object includes:
   at least one method for converting the standard intermediate form to at least one binary number.

4. The apparatus of claim 1, wherein each of the plurality of number formatting classes includes at least one number-to-text method for converting numerical information into text.

5. The apparatus of claim 4, wherein the at least one number-to-text method includes means for providing a confidence indication.

6. The apparatus of claim 4, wherein the number-to-text conversion method includes:
   at least one method for converting numerical information in the standard intermediate form to a text form.

7. The apparatus of claim 1, wherein each of the plurality of number formatting classes includes class code for instantiating at least one object for managing language-specific numerals.

8. The apparatus of claim 1, wherein each of the plurality of number formatting classes includes at least one method for formatting positive and negative numbers.

9. The apparatus of claim 1, wherein each of the plurality of number formatting classes includes at least one method for managing out of bounds processing.

10. The apparatus of claim 1, wherein the polymorphic instantiation means includes:
    (a) means responsive to numerical information in the first format for polymorphically instantiating a first number formatter object from one of the plurality of number formatting classes for attempting a first conversion of numerical information and for returning a confidence value indicating the results of the first conversion attempt; and
    (b) means responsive to numerical information in the first format for polymorphically instantiating a second number formatter object from one of the plurality of number formatting classes for performing a second conversion when the first conversion results in a confidence value which does not meet predetermined criteria.

11. The apparatus of claim 1, wherein the number formatter framework includes class code for instantiating at least one object for mapping character-values.

12. The apparatus of claim 1, including display means for dynamically aligning any textual representation of numbers.

13. The apparatus of claim 1, wherein at least one of the plurality of number formatting classes has methods for formatting numerical information in an additive format.

14. The apparatus of claim 1, wherein at least one of the plurality of number formatting classes has methods for formatting numerical information in a positioned format.

15. A computer implemented method for use in a computer system having a processor and a storage, the method converting numerical information between a first format and a binary number, and comprising the steps of:
    (a) constructing a canonical number formatter object in the storage which translates numerical information between a standard intermediate form and a binary number;
    (b) storing a number formatting framework having a plurality of number formatting classes arranged in a class hierarchy, each of the plurality of number formatting classes having methods for converting numerical information between one of a plurality of first formats and the standard intermediate form;
    (c) polymorphically instantiating a number formatting object from one of the plurality of number formatting classes in response to numerical information in the first format; and
    (d) converting the numerical information in the first format to a binary number using methods in the number formatting object.

16. The method of claim 15, wherein the first format is text and step (d) includes the step of:
    (d1) converting numerical information in text format to at least one binary number.

17. The method of claim 16, wherein step (d1) includes the steps of:
    (d1a) converting text to a standard intermediate form; and
    (d1b) converting the standard intermediate form to at least one binary number.

18. The method of claim 17, wherein step (d1a) includes the step of generating conversion result information based on the conversion operation.

19. The method of claim 18, wherein the step of generating conversion result information includes the step of providing a confidence indication.

20. The method of claim 15, including the step of:
    (e) Using the number formatter object to convert at least one binary number to text.

21. The method of claim 20, wherein step (e) includes the steps of:
    (e1a) converting at least one binary number to a standard intermediate form; and
    (e1b) converting the standard intermediate form to a textual form.

22. The method of claim 15, wherein step (d) includes the step of:

(d2) converting numerical information in the first format with language-specific numerals to a binary number.

23. The method of claim 15, wherein step (d) includes the step of:

(d3) formatting positive and negative numbers.

24. The method of claim 15, wherein step (d) includes the step of:

(d4) detecting an out of bounds processing condition.

25. The method of claim 15, wherein step (d) includes the steps of:

(d5) attempting a first conversion of numerical information and generating a confidence value based on the conversion; and (d6) performing a second conversion when the confidence value does not meet predetermined criteria.

26. The method of claim 15, wherein step (d) includes the step of:

(d7) dynamically aligning and displaying any textual representation of numeric information.

27. The method of claim 15, wherein step (d) includes the step of mapping character values.

28. The method of claim 15, wherein step (d) includes the step of formatting numerical information in an additive format.

29. The method of claim 15, wherein step (d) includes the step of formatting numerical information in a positional format.

30. A computer program product for use in a computer system having a processor and a storage, the computer program product converting numerical information between a first format and a binary number and comprising a computer usable medium having computer readable program code thereon including:

(a) program code for constructing a canonical number formatter object in the storage which translates numerical information between a standard intermediate form and a binary number;

(b) a number formatter framework having a plurality of number formatting classes arranged in a class hierarchy, each of the plurality of number formatting classes having methods for converting numerical information between one of a plurality of first formats and the standard intermediate form;

(c) program code for loading the number formatter framework into the storage; and (d) program code responsive to numerical information in the first format for polymorphically instantiating a number formatting object from one of the plurality of number formatting classes.

31. The computer program product of claim 30, wherein each of the number formatting classes includes at least one text-to-number conversion method for converting text to at least one number.

32. The computer program product of claim 31, wherein the text-to-number conversion method includes:

at least one method for converting text to the standard intermediate form; and wherein the canonical number formatter object includes:

at least one method for converting the standard intermediate form to at least one binary number.

33. The computer program product of claim 30, wherein each of the plurality of number formatting classes includes at least one number-to-text method for converting numerical information into text.

* * * * *